US006152079A

United States Patent [19]

Chandler

[11] Patent Number: 6,152,079

[45] Date of Patent: Nov. 28, 2000

[54] APPARATUS FOR THE COLLECTION AND STORAGE OF PET WASTE

[76] Inventor: Helen Chandler, 126 E. Crafton Ave., Crafton, Pa. 15205

[21] Appl. No.: 09/349,444

[22] Filed: Jul. 9, 1999

[51] Int. Cl.[7] .............................. A01K 1/01; A01K 29/00

[52] U.S. Cl. ............................. 119/161; 206/554; 294/1.3

[58] Field of Search .................................... 119/161, 867, 119/170; 294/1.3, 1.4, 1.5; D30/160; 232/43.5; 248/95; 206/554, 457, 459.5, 466

[56] References Cited

U.S. PATENT DOCUMENTS

| | | | |
|---|---|---|---|
| D. 330,786 | 11/1992 | Edgar | D30/161 |
| 3,803,738 | 4/1974 | Weiss | 40/306 |
| 4,138,153 | 2/1979 | Brown | 294/1 R |
| 4,272,116 | 6/1981 | Tufte, Jr. | 294/1 B |
| 4,286,816 | 9/1981 | Tobias | 294/1 |
| 4,519,502 | 5/1985 | Jackson, II et al. | 206/390 |
| 4,627,383 | 12/1986 | Metzger | 119/1 |
| 4,706,845 | 11/1987 | Schnurer et al. | 221/102 |
| 5,167,377 | 12/1992 | Chalmers | 225/46 |
| 5,280,978 | 1/1994 | Bohn | 294/1.3 |
| 5,363,807 | 11/1994 | Kakuta | 604/164 |
| 5,551,569 | 9/1996 | Garvin-Mazzarisi | 206/554 |
| 5,620,220 | 4/1997 | Khoshnood | 294/1.3 |
| 5,678,723 | 10/1997 | Swift et al. | 220/407 |
| 5,713,302 | 2/1998 | Walter | 119/165 |
| 5,803,293 | 9/1998 | Lovekin | 220/4.03 |
| 5,881,900 | 3/1999 | Meshorer | 220/495.07 |
| 5,957,325 | 9/1999 | Montanez | 221/131 |

*Primary Examiner*—Peter M. Poon
*Assistant Examiner*—Yvonne R. Abbott
*Attorney, Agent, or Firm*—John D. Guggiotta

[57] ABSTRACT

An apparatus for the collection and storage of pet waste, comprised of designed as an all-in-one unit for pet owners for picking up their animals waste matter. The present invention is comprised of a waste drop box, a disposable plastic bag dispenser complete with disposable plastic bags, and a reminder sign. The present invention is designed to be placed in public parks or anywhere that pet owners frequently walk their pets. Once they enter the park, the pet owner reads the reminder sign and pulls a disposable plastic bag from the disposable plastic bag dispenser.

5 Claims, 6 Drawing Sheets

APPARATUS FOR THE COLLECTION AND STORAGE OF PET WASTE

RELATED APPLICATIONS AND DISCLOSURES

The present invention was first disclosed in the Disclosure Document filed on Apr. 17, 1999. There have been no previously filed, nor any co-pending applications, anywhere in the world.

BACKGROUND OF THE INVENTION

1. Field of the Invention

The present invention relates generally to pet waste disposal device, and, more particularly, to an apparatus for the collection and storage of pet waste.

2. Description of the Related Art

Dogs are beloved pets for millions of people in the United States. Dogs bring much joy and love into people's lives. In addition, owning a dog brings responsibilities. One such responsibility is that of picking up dog waste when the dog is in a public place and relieves itself.

Most cities and towns have ordinances that require dog owners to pick up their animal's waste or face a fine. However, collecting and disposing of pet waste can be troublesome for several reason.

First, the pet owner must always remember to carry a device to pick up the pet waste. If they forget, they face being fined.

Even if they remember to carry a waste collection device, such as a plastic bag, carrying around waste once it is picked up can be bothersome and messy. A garbage can may not always be near by.

Third, some people may not know that they have to clean up after their pets in parks. These people need a reminder as well as access to a waste pickup device.

Fourth, even if there are garbage cans around to place the waste in after it is picked up, the waste may create an undesired odor, especially in public places, such as parks and recreation areas, where people cook and eat food.

Therefore, what is needed is a device that remind people to pick up their pet waste, provide a device to pick up the waste, and provide a convenient disposal mechanism for the waste once it is collected.

In the related art, several devices are disclosed that describe the design and function of a containment device for collected pet waste. These include U.S. Pat. No. 5,803,293, issued in the name of Lovekin, U.S. Pat. No. 5,713,302, issued in the name of Walter, U.S. Pat. No. 5,620,220, issued in the name of Khoshnood, U.S. Pat. No. 5,280,978, issued in the name of Bohn, and U.S. Pat. No. D 330,786, issued in the name of Flisek.

U.S. Pat. No. 5,363,807, issued in the name of Kakutz, describes an automated pet toilet.

U.S. Pat. No. 4,627,383, issued in the name of Metzger, discloses an animal waste collection system.

U.S. Pat. No. 4,286,816, issued in the name of Tobias, describes a collection and disposal device for pet waste.

U.S. Pat. No. 4,272,116, issued in the name of Toffe, Jr. discloses a bag and scooper device for disposal of pet waste.

U.S. Pat. No. 4,138,153, issued in the name of Brown describes a self-contained sanitary pet fecal waste container.

A search of the prior art did not disclose any patents that anticipate directly many features of the instant invention. Consequently, a need has been felt for providing an apparatus and method which overcomes all the problems cited above.

SUMMARY OF THE INVENTION

It is therefore an object of the present invention to provide an improved apparatus for the collection and storage of pet waste that reminds people to pick up their pet waste, provides a device to pick up the waste, and provides a convenient disposal mechanism for the waste once it is collected.

Briefly described according to one embodiment of the present invention, a apparatus for the collection and storage of pet waste is disclosed, designed as an all-in-one unit for pet owners for picking up their animals waste matter.

The present invention is comprised of a waste drop box, a disposable plastic bag dispenser complete with disposable plastic bags, and a reminder sign. The present invention is designed to be placed in public parks or anywhere that pet owners frequently walk their pets. Once they enter the park, the pet owner reads the reminder sign and pulls a disposable plastic bag from the disposable plastic bag dispenser.

They can then place the pet's waste matter in the disposable plastic bag and dispose of it in the waste drop box. The waste drop box can then be periodically emptied by the park employees or trash collectors. It is envisioned that the present invention may be comprised of a material selected from the group comprising pre-treated wood, heavy-duty stainless steels, and plastics.

DESCRIPTIVE KEY

| | | | |
|---|---|---|---|
| 10 | apparatus for the collection and storage of pet waste | 70 | base |
| | | 80 | waste drop box opening |
| 15 | waste | 90 | waste drop box access hatch |
| 20 | waste drop box | 100 | waste drop box locking means |
| 30 | plastic bag dispenser | 110 | bag dispenser access hatch |
| 40 | plastic bag | 120 | bag dispenser locking means |
| 50 | reminder sign | 130 | bag dispenser opening |
| 60 | post | | |

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 4 is a rear view thereof, shown above the ground before insertion of the post therein to;

DESCRIPTION OF THE PREFERRED EMBODIMENTS

Figure 1:
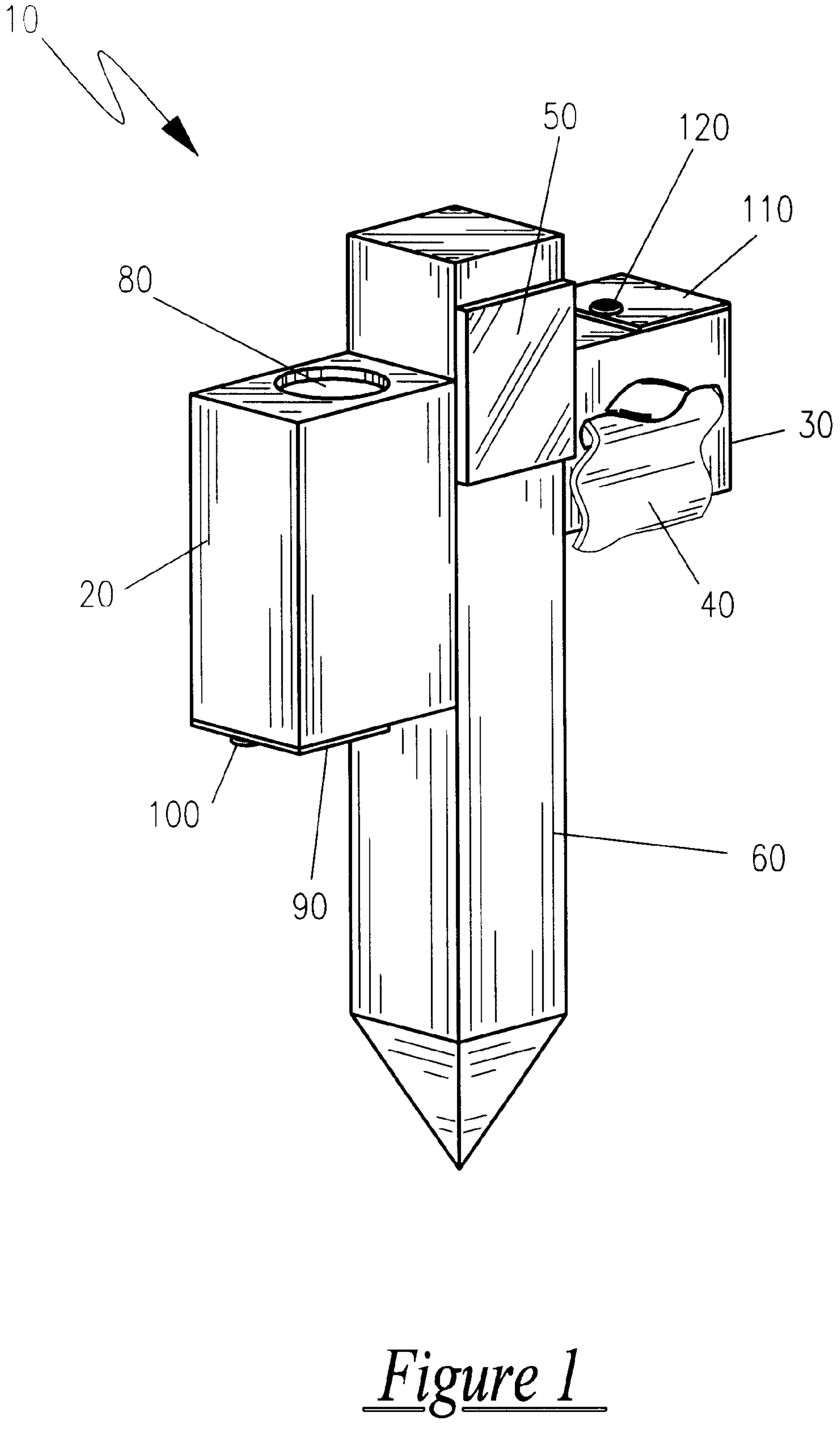
FIG. 1 is a front perspective view of the preferred embodiment of apparatus for the collection and storage of pet waste 10.

The best mode for carrying out the invention is presented in terms of its preferred embodiment, herein depicted within the FIGS. 1 through 6, 8 and 9.

1. Detailed Description of the Figures

Referring now to FIGS. 1 through 6, an apparatus for the collection and storage of pet waste 10 is shown, according to the present invention, designed as an all-in-one unit for pet owners for picking up their animals waste matter 15 (not shown in FIGS. 1 through 6).

The present invention is comprised of a waste drop box 20, a disposable plastic bag dispenser 30 complete with disposable plastic bags 40, and a reminder sign 50.

All components of the present invention are secured to a post 60. The post 60 is of a generally linearly elongated, rectangular configuration of sufficient height so that the waste drop box 20 and disposable plastic bag dispenser 30 can be easily reached and the reminder sign 50 easily read by a man or woman of average height.

Figure 4:
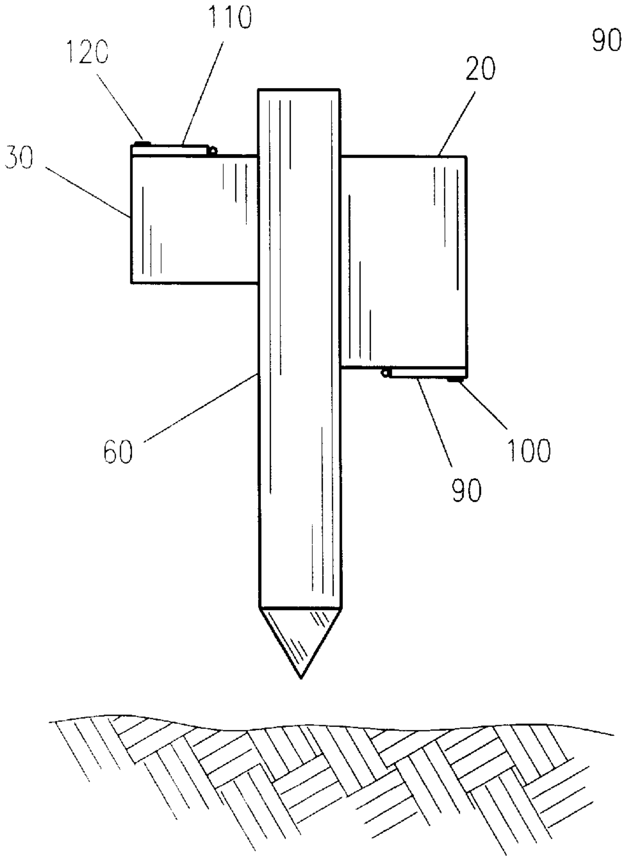
Figure 5:
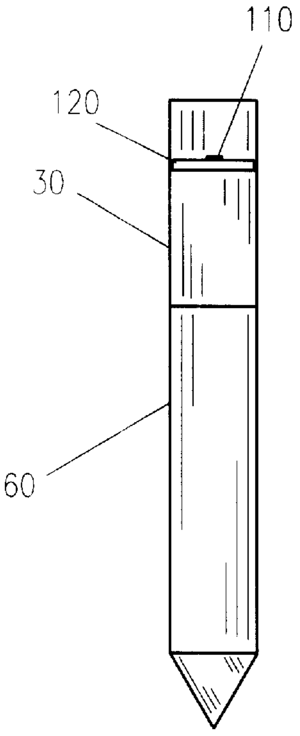
FIG. 5 is a right side view of the preferred embodiment of the present invention.
Figure 6:
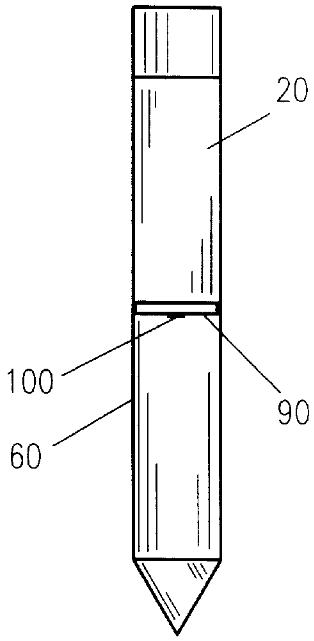
FIG. 6 is a left side view thereof.
Figure 7:
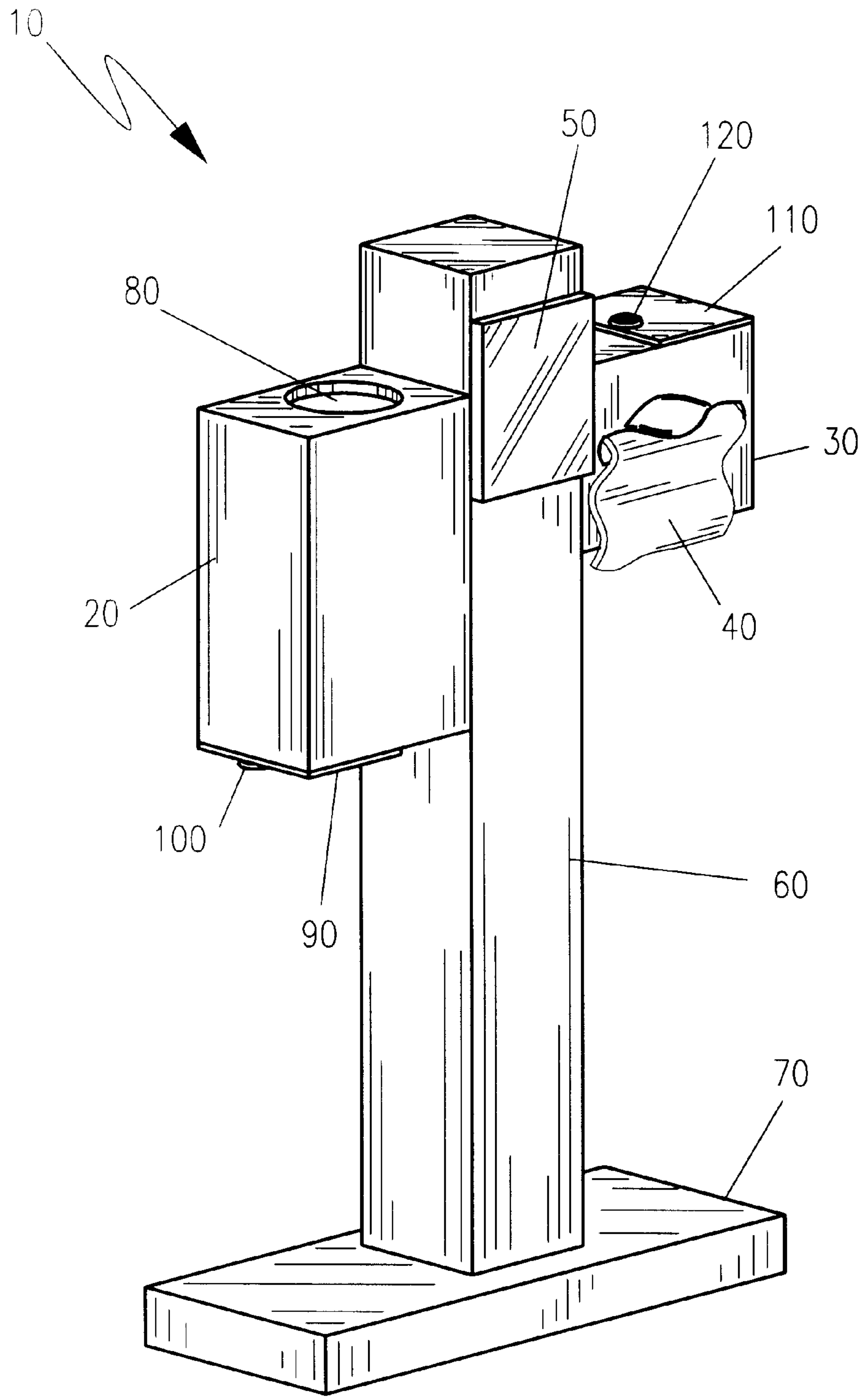
FIG. 7 is a perspective view of an alternate embodiment of the present invention.

Referring now to FIG. 4, the post 60 may be inserted into the ground. In an alternate embodiment of the present invention, a base 70 supports the post 60 in the vertical position.

Referring now to FIG. it is envisioned that the reminder sign 50 will contain words that request that the owner pick up the animal's waste and that failure to do so is a violation of any applicable ordinances.

Referring now to FIGS. 1 through 7, it is envisioned that the waste drop box 20 would be of a generally rectangular or oval configuration with an internal volume and having an waste drop box opening 80 at the top to allow entry of the plastic bags 40. It is envisioned that the opening would provide a restricted entranceway for insertion of used plastic bags 40.

Figure 3:
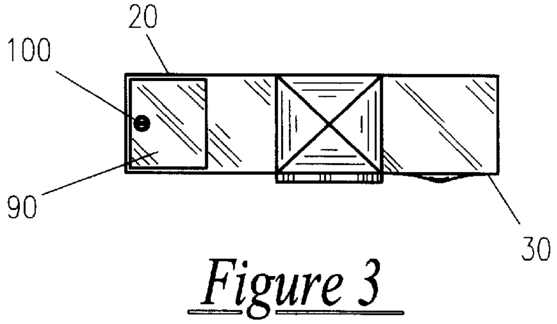
FIG. 3 is a bottom view thereof.

Referring now to FIG. 3, a waste drop box access hatch 90, located on the waste drop box 20, allows easy access to the waste 15 (not shown) for disposal purposes. For purposes of disclosure, the waste drop box access hatch 90 is located on the bottom surface of the waste drop box 20.

Referring now to FIGS. 1,3,4 and 6, it is envisioned that a waste drop box locking means 100 is used to prevent unauthorized opening of the waste drop box access hatch 90.

Figure 2:
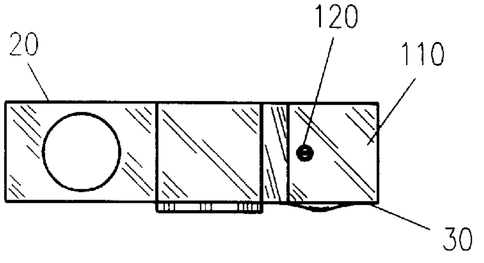
FIG. 2 is a top view thereof.

Referring now to FIGS. 1 and 2, it is envisioned that the plastic bag dispenser 30 would have a bag dispenser access hatch 110 at the top to allow refilling with a plurality of plastic bags 40.

Referring now to FIGS. 1,2,4 and 5, it is envisioned that a bag dispenser locking means 120 is used to prevent unauthorized opening of the bag dispenser access hatch 110.

Referring now to FIG. 1, a bag dispenser opening 130, located on the plastic bag dispenser 30, allows easy access to the plastic bags 40 by pet owners.

It is envisioned that the present invention may be comprised of a material selected from the group comprising pretreated wood, heavy-duty stainless steels, and plastics.

It is envisioned that other styles and configurations of the present invention can be easily incorporated into the teachings of the present invention, and only one particular configuration shall be shown and described for purposes of clarity and disclosure and not by way of limitation of scope.

2. Operation of the Preferred Embodiment

Figure 8:
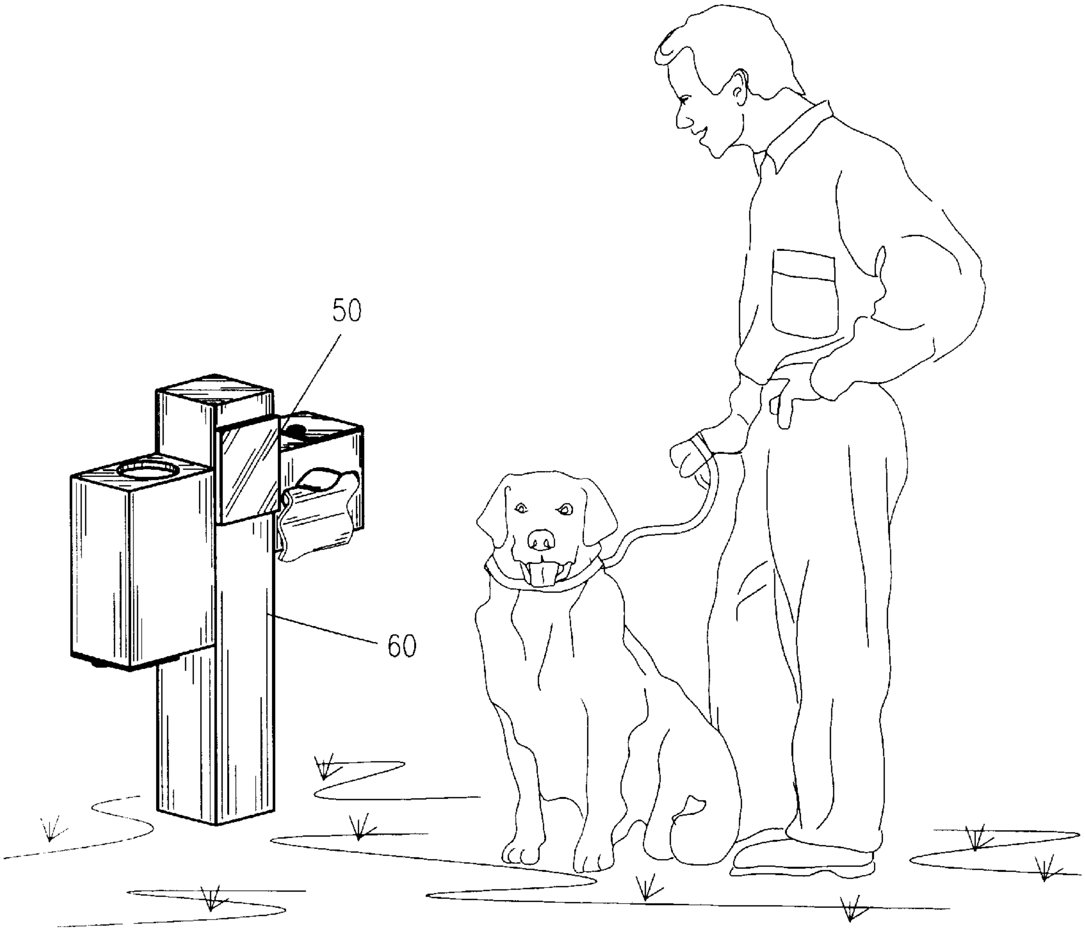
FIGS. 8, 9 and 10 are in-use views of the preferred embodiment of the present invention.
Figure 9:
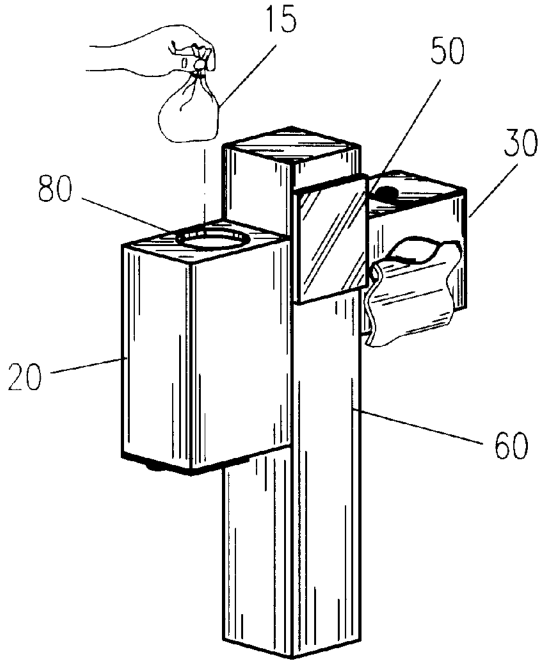
Figure 10:
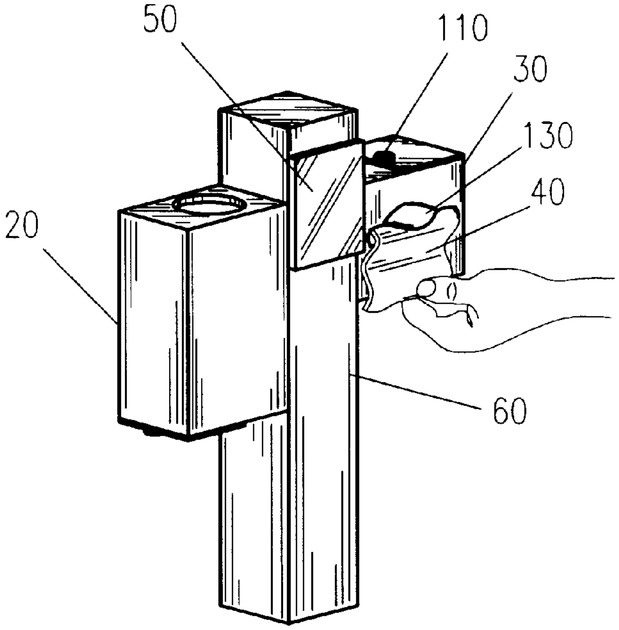

Referring now to FIGS. 8 through 10, to use the present invention, the present invention is placed in public parks or anywhere that pet owners frequently walk their pets; once the pet owners enter the park, the pet owner will see and likely read the reminder sign 50 and pull a disposable plastic bag 40 from the disposable plastic bag dispenser 30; they can then place the pet's waste matter 15 in the disposable plastic bag 40 and dispose of it in the waste drop box 20; the waste drop box 20 can then be periodically emptied by the park employees or trash collectors.

The foregoing description is included to illustrate the operation of the preferred embodiment and is not meant to limit the scope of the invention. The scope of the invention is to be limited only by the following claims.

What is claimed is:

1. An apparatus for the collection and storage of pet waste comprising:

a waste drop box, said waste drop box designed to hold pet waste inserted into said waste drop box by pet owners;

a disposable plastic bag dispenser, said disposable plastic bag dispenser designed to dispense disposable plastic bags;

a plurality of disposable plastic bags, located inside of said disposable plastic bag dispenser;

a reminder sign, said reminder sign containing words that request that the owner pick up the animal's waste and that failure to do so is a violation of any applicable ordinances; and a post, said post being of a generally linearly elongated, rectangular configuration of sufficient height so that the waste drop box and disposable plastic bag dispenser can be easily reached and the reminder sign easily read by a man or woman of average height, said reminder sign, disposable plastic bag dispenser and said waste drop box being secured to said post.

2. The apparatus for the collection and storage of pet waste described in claim 1, wherein said post may be inserted into the ground or contain a base that supports the post in the vertical position.

3. The apparatus for the collection and storage of pet waste described in claim 1, wherein said waste drop box is hollow in configuration, and further comprises:

a waste drop box opening, said waste drop box opening located at the top of said waste drop box, and designed to allow entry of said plurality of plastic bags;

a waste drop box access hatch, said waste drop box access hatch located on the waste drop box, and designed to allow easy access to the waste for disposal purposes; and a waste drop box locking means, said waste drop box locking means used to prevent unauthorized opening of the waste drop box access hatch.

4. The apparatus for the collection and storage of pet waste described in claim 1, wherein said bag dispenser is hollow in configuration, and further comprises:

a bag dispenser access hatch, said bag dispenser access hatch located at the top of said bag dispenser to allow refilling of said plurality of plastic bags;

a bag dispenser locking means, said bag dispenser locking means used to prevent unauthorized opening of the bag dispenser access hatch; and a bag dispenser opening, said bag dispenser opening allowing easy access to the plastic bags by pet owners.

5. The apparatus for the collection and storage of pet waste described in claim 1, wherein said apparatus for the collection and storage of pet waste is comprised of a material selected from the group comprising pre-treated wood, heavy-duty stainless steels, and plastic.

* * * * *